United States Patent
Ghanem

(10) Patent No.: US 10,095,214 B2
(45) Date of Patent: Oct. 9, 2018

(54) SYSTEM AND METHOD FOR JOINING WORKPIECES TO FORM AN ARTICLE

(71) Applicant: George K. Ghanem, Columbus, OH (US)

(72) Inventor: George K. Ghanem, Columbus, OH (US)

(73) Assignee: ProcessChamp, LLC, Columbus, OH (US)

( * ) Notice: Subject to any disclaimer, the term of this patent is extended or adjusted under 35 U.S.C. 154(b) by 240 days.

(21) Appl. No.: 15/131,131

(22) Filed: Apr. 18, 2016

(65) Prior Publication Data

US 2017/0052534 A1 Feb. 23, 2017

Related U.S. Application Data

(60) Provisional application No. 62/208,124, filed on Aug. 21, 2015.

(51) Int. Cl.
*G06F 19/00* (2018.01)
*G05B 19/402* (2006.01)
*G05B 19/418* (2006.01)

(52) U.S. Cl.
CPC ..... *G05B 19/402* (2013.01); *G05B 19/41805* (2013.01); *G05B 2219/35134* (2013.01); *G05B 2219/42249* (2013.01); *G05B 2219/45067* (2013.01); *Y02P 90/04* (2015.11); *Y02P 90/265* (2015.11)

(58) Field of Classification Search
CPC ....... G06Q 10/00; G06T 7/0004; G06T 17/00; B25J 9/04; B25J 15/0019; B23K 26/046; D06F 37/225; C07B 61/00; G01B 21/20; G05B 19/41805; G05B 19/402; G05B 2219/42249

See application file for complete search history.

(56) References Cited

U.S. PATENT DOCUMENTS 4,430,718 A * 2/1984 Hendren ................. G06T 17/00
219/69.12
4,813,125 A 3/1989 Dacey, Jr.
(Continued)

FOREIGN PATENT DOCUMENTS

WO 2007/004983 A1 1/2007

*Primary Examiner* — Tuan A Vu
(74) *Attorney, Agent, or Firm* — Harness, Dickey & Pierce, P.L.C.

(57) ABSTRACT

Workpieces are placed in the workstation so one is in registration with a fixed locator. Measurement data are obtained reflecting the positions of the respective features of the workpieces and represented in a common reference frame associated with the fixed locator. A processor uses the collection of assembly data and the measurement data to define and store ordered pairs of mating feature locations. The pairs are then reoriented using a computationally discovered best fit. The position of a feature demarked for registration with the adjustable locator is calculated and the adjustable locator is caused to move to the calculated position of the feature demarked for registration thereby establishing a best fit orientation of the mating workpieces in physical space. The mating workpieces are then positioned in said best fit orientation by registration with said fixed and adjustable locators and then mechanically joining the mating workpieces.

16 Claims, 11 Drawing Sheets

(56) References Cited

U.S. PATENT DOCUMENTS

| | | | |
|---|---|---|---|
| 4,827,595 A | 5/1989 | Dacey, Jr. | |
| 4,884,431 A | 12/1989 | Dacey, Jr. | |
| 4,976,026 A | 12/1990 | Dacey, Jr. | |
| 5,010,634 A | 4/1991 | Uemura et al. | |
| 5,197,846 A * | 3/1993 | Uno | B25J 9/04 |
| | | | 414/731 |
| 5,239,739 A | 8/1993 | Akeel et al. | |
| 5,272,805 A | 12/1993 | Akeel et al. | |
| 5,380,978 A | 1/1995 | Pryor | |
| 5,910,894 A | 6/1999 | Pryor | |
| 6,409,435 B1 | 6/2002 | Kocherovsky | |
| 6,532,422 B1 * | 3/2003 | Elgersma | D06F 37/225 |
| | | | 68/23.2 |
| 6,691,392 B2 | 2/2004 | Savoy et al. | |
| 6,971,175 B2 | 12/2005 | Savoy et al. | |
| 7,143,494 B2 | 12/2006 | Savoy | |
| 7,469,473 B2 | 12/2008 | Savoy | |
| 7,913,370 B2 | 3/2011 | Savoy | |
| 9,068,809 B1 | 6/2015 | Lagally et al. | |
| 2002/0077721 A1 * | 6/2002 | Linn | G05B 19/41805 |
| | | | 700/193 |
| 2006/0093205 A1 * | 5/2006 | Bryll | G06T 7/0004 |
| | | | 382/152 |
| 2006/0167587 A1 | 7/2006 | Read | |
| 2008/0000069 A1 | 1/2008 | Savoy | |
| 2009/0019927 A1 * | 1/2009 | Tobisawa | G01B 21/20 |
| | | | 73/162 |
| 2009/0112349 A1 | 4/2009 | Cobb et al. | |
| 2010/0253637 A1 | 10/2010 | Lieberman et al. | |
| 2012/0041585 A1 | 2/2012 | Mather | |
| 2012/0066217 A1 * | 3/2012 | Eder | G06Q 10/00 |
| | | | 707/723 |
| 2012/0072021 A1 | 3/2012 | Walser et al. | |
| 2012/0152911 A1 | 6/2012 | Diez et al. | |
| 2013/0178627 A1 * | 7/2013 | Freitas, Jr. | C07B 61/00 |
| | | | 546/10 |
| 2014/0144895 A1 * | 5/2014 | Stork Genannt Wersborg | B23K 26/046 |
| | | | 219/121.75 |
| 2015/0014283 A1 | 1/2015 | Peters et al. | |
| 2015/0028611 A1 * | 1/2015 | Asamizu | B25J 15/0019 |
| | | | 294/119.1 |
| 2015/0276376 A1 | 10/2015 | Lagally et al. | |

* cited by examiner

SYSTEM AND METHOD FOR JOINING WORKPIECES TO FORM AN ARTICLE

CROSS-REFERENCE TO RELATED APPLICATIONS

This application claims the benefit of U.S. Provisional Application No. 62/208,124, filed on Aug. 21, 2015. The entire disclosure of the above application is incorporated by reference as if fully set forth in detail herein.

FIELD

The present disclosure relates to a system and method for joining workpieces to form an article.

BACKGROUND

This section provides background information related to the present disclosure which is not necessarily prior art.

It is relatively common in the manufacture of articles, such as automobile bodies, printed circuit boards, and aircraft fuselages, to secure components to fixtures and then to assemble the components together. The fixtures are intended to orient the components relative to one another, in a manner that attempts to position selected features on the components at a nominal position. This practice has significant drawbacks including dimensional variability leading to quality issues, high scrap and a reduced ability to compete in a global market. As an example, variation reduction in the assembly of automotive bodies is a challenging endeavor. A typical automobile body can employ between 100 to 150 sheet metal parts, which can be assembled to one another in a modern, high volume assembly line in 55 to 75 assembly stations. The assembly line can have between 1500 to 2000 fixture locators that are employed to locate various combinations of the components to perform approximately 4000 welds. A single failure that occurs at a locator, a welding spot or from a part that is not fabricated correctly can cause a dimensional variation. This variation will then propagate downstream from station to station and accumulate at the final station of the body assembly. After fabrication/assembly of the body, the vehicle doors, hood, windshield, and trunk lid are then mounted and fit to the body. The dimensional variation is accumulated at the body assembly openings, compounded by variations associated with panels or other subassemblies, and will significantly increase the manufacturing complexity, leading to more tooling failures and unexpected downtime and reduction in both product quality and production throughput. These issues can also cause leaks, noise and risk of water leakage. While there has been much accomplishment in the art of data acquisition using laser sensors and optics, little has been done to utilize the data in real time to impact the dynamic movement of the tooling to reduce variation. Most manufacturing companies continue to rely on human knowledge and analysis to estimate and make tooling corrections (shimming) one locator at a time—after the fact, meaning parts have already been incorrectly joined. It's worthy to note that dimensional problems contribute to approximately two thirds of all quality-related problems during new product launches.

One drawback relates to variation in the manufacturing processes for the body components and the inability of the prior art assembly practice to immediately adjust to the particular tolerance/configuration of a body part loaded into the weld fixture.

Conventional weld fixtures commonly employ locator pins that engage holes in one or more of the body components. As many of the body components are stampings, the diameter of the holes tends to be relatively consistent, but due to variation in the material from which the body components are formed (e.g., chemical composition, microstructure, thickness of the material) and variation in the processing of the material (e.g., temperature of the stamping die, type/condition of lubrication, amount of lubrication, temperature of workpiece, speed in which the body component is formed), the exact location of these holes tends to move (albeit in a small manner) relative to other features on the body component. It should be appreciated that while the variation is relatively small, the variation of each of the features can compound when the body component is joined to other body components.

Despite the existence of part-to-part variation in a body component, it is common practice in the assembly plants to employ nominal part geometry and/or historic sample data to position a locator relative to a frame of a weld fixture and thereafter employ trial-and-error techniques to reposition (i.e., shim) the locator as needed. Moreover, in an attempt to eliminate small positioning errors between the weld fixture and the body component (which would further contribute to undesired variation in the joining of the body components together), the locator pins are commonly sized to the largest possible or largest statistically probable diameter of the hole in the body component. Consequently, it is not uncommon for the locator pin to engage the hole in the body component in an interference fit manner. Moreover, it is not uncommon, due to the variation in the positioning of the hole(s) in the body component relative to other features, to have the locator pin offset from the hole in the body component (i.e., the axis of the locator pin is offset from the axis or centerline of the hole in the body component). Accordingly, a relatively large amount of stress can be exerted on the body component and the locator pin as a result of the interference between the locator pin and the hole in the body component, and the offset between the axis of the locator pin and the centerline of the hole in the body component. These stresses induce wear on the locator pins, which can essentially machine the locator pins to a smaller diameter, and can cause the locator pin to fail.

In view of the above remarks, there remains a need in the art for an improved process for fabricating a multi-piece assembly that is formed by joining multiple components together.

SUMMARY

This section provides a general summary of the disclosure, and is not a comprehensive disclosure of its full scope or all of its features.

In accordance with one aspect, a method is disclosed for forming a multi-piece assembly in a plurality of joining operations that progressively joins workpieces together, each of the workpieces having one or more features, the multi-piece assembly having an assembly specification that defines target positions of the features of the workpieces relative to a datum. According to the method first and second workpieces are secured to at least a first assembly fixture. An initial positioning is determined between the first and second workpieces that relates a first three-dimensional data set of the first workpiece to a second three-dimensional data set of the second workpiece. The first three-dimensional data set includes three-dimensional data on each of the features on the first workpiece; the second three-dimensional data set includes three-dimensional data on each of the features on the second workpiece. A desired relative positioning is determined between the first and second workpieces based at least partly on the first and second three-dimensional data sets and the assembly specification. The desired relative positioning is specific to a given pair of the first and second workpieces and is configured to locate each of the features of the first and second workpieces in such a way that discrepancies in the positioning of all of the features on the first and second workpieces relative to their positioning in the assembly specification are minimized in a desired manner.

While the first and second workpieces are secured in the at least a first assembly fixture, the first workpiece is repositioned relative to the second workpiece such that the first and second workpieces are in the desired relative positioning; and the first and second workpieces are then together.

According to a further aspect the joined first and second workpieces form a sub-assembly and the method further includes securing the sub-assembly and a third workpiece to at least a second assembly fixture; determining an initial positioning between the sub-assembly and the third workpiece that relates the first and second three-dimensional data sets to a third three-dimensional data set of the third workpiece, the third three-dimensional data set including three-dimensional data on each of the features on the third workpiece; determining a desired relative positioning between the sub-assembly and the third workpiece based at least partly on the first, second and third three-dimensional data sets and the assembly specification, wherein the desired relative positioning between the sub-assembly and the third workpiece is specific to a given pair of the sub-assembly and the third workpiece and is configured to locate each of the features of the third workpiece relative to the features of the sub-assembly in such a way that discrepancies in the positioning of all of the features on the first, second and third workpieces relative to their positioning in the assembly specification are minimized in a desired manner; while the sub-assembly and the third workpiece are secured to the at least the second assembly fixture, repositioning the third workpiece relative to the sub-assembly such that the sub-assembly and the third workpiece are in the desired relative positioning between the sub-assembly and the third workpiece; and joining the sub-assembly and the third workpiece together.

According to another aspect, a method is disclosed for forming a multi-piece assembly by joining mating workpieces in a workstation having at least one fixed locator and at least one adjustable locator, wherein each workpiece has at least one physical feature, the position of which within the multi-piece assembly is expressed in a collection of assembly data. The workpieces are placed in the workstation so that one of said workpieces is in registration with the fixed locator. Measurement data are obtained reflecting the positions of the respective features of the workpieces and representing the measurement data in a common reference frame associated with the fixed locator.

A processor is then used to ingest and utilize the collection of assembly data and the measurement data to define and store in memory ordered pairs of mating features. The processor is used to define and store in memory, for each ordered pair of mating features, a test vector that connects a pair of mating features, where each test vector has vector components represented as variables stored in memory. The processor is then used to computationally discover a best fit for the mating workpieces by collectively applying to the test vectors a computational optimization process that seeks to minimize the lengths of the test vectors while taking into account predefined weighting factors that give certain features locational preference over others.

The processor then reorients the data representing the feature locations of the respective workpieces in the common reference frame using the computationally discovered best fit. The processor then calculates the position in the common reference frame of a feature demarked for registration with the adjustable locator. The adjustable locator is then caused to move to the calculated position of the feature demarked for registration with the adjustable locator and thereby establishing a best fit orientation of the mating workpieces in physical space. When this is done, the mating workpieces are positioned in said best fit orientation by registration with said fixed and adjustable locators and then mechanically joining the mating workpieces.

In yet another aspect, method is disclosed for forming a multi-piece assembly by joining mating workpieces in a workstation having at least one fixed locator and at least one adjustable locator, wherein each workpiece has at least one physical feature, the position of which within the multi-piece assembly is expressed in a collection of assembly data. The workpieces are placed in the workstation so that one of said workpieces is in registration with the fixed locator. Measurement data are obtained reflecting the positions of the respective features of the workpieces and representing the measurement data in a common reference frame associated with the fixed locator.

A processor is then used to ingest and utilize the collection of assembly data and the measurement data to define and store in memory ordered pairs of mating feature locations. The processor is used to reorient the pairs of mating feature locations using a computationally discovered best fit. The processor is then used to calculate the position in the common reference frame of a feature demarked for registration with the adjustable locator. The adjustable locator is then caused to move to the calculated position of the feature demarked for registration with the adjustable locator and thereby establishing a best fit orientation of the mating workpieces in physical space; The mating workpieces are then positioned in said best fit orientation by registration with said fixed and adjustable locators and then mechanically joining the mating workpieces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Contrary to conventional manufacturing practice, where fixed locators control physical relationship among workpieces to be joined, the disclosed system and method takes the actual, measured geometric properties of each workpiece into account and uses a processor to control a variable locating and positioning system so that the workpieces may be assembled in an optimal way to form the finished article. As will be more fully explained, the measured geometric properties of each workpiece can be measured at the assembly workstation, or they may be measured in advance and supplied as data with each workpiece. The processor can be implemented either by the assembly workstation controller or by a separate computer that communicates with the controller.

Specifically, the processor is supplied with data describing how the workpieces are to be assembled into the finished article. This can be performed by supplying the processor with computer-aided design (CAD) data or by using a master component with high dimensional accuracy. The processor uses the supplied data and workpiece measurement data to compute an optimal solution whereby these specifically measured workpieces can be joined according to the supplied data (e.g., CAD data). As will be explained, the optimization algorithm executed by the processor takes predefined weighting factors into account, to cause the positions of certain points to more stringently adhere to the supplied data than other points. Thus, for example, in the case of an automobile assembly, joining the underbody to the side of the car or the fit between the passenger door and frame can be made more precise, at the expense of permitting a looser fit between other components where a precise fit is of little consequence.

As will be more fully explained, using the optimization algorithm, the processor calculates the optimal way to fit a particular, measured set of workpieces together. The processor then determines where the positioning fixture locators of a workstation need to be positioned to allow the workpieces to be assembled according to the determined optimal fit. The processor then sends control signals to cause these locators and/or the arms of dynamic positioners (e.g., positioning robots) to place the workpieces in their proper position so that they may be permanently joined. To better appreciate how the optimization algorithm can improve the workpiece joining process, a discussion of an exemplary manufacturing process will now follow.

Figure 1:
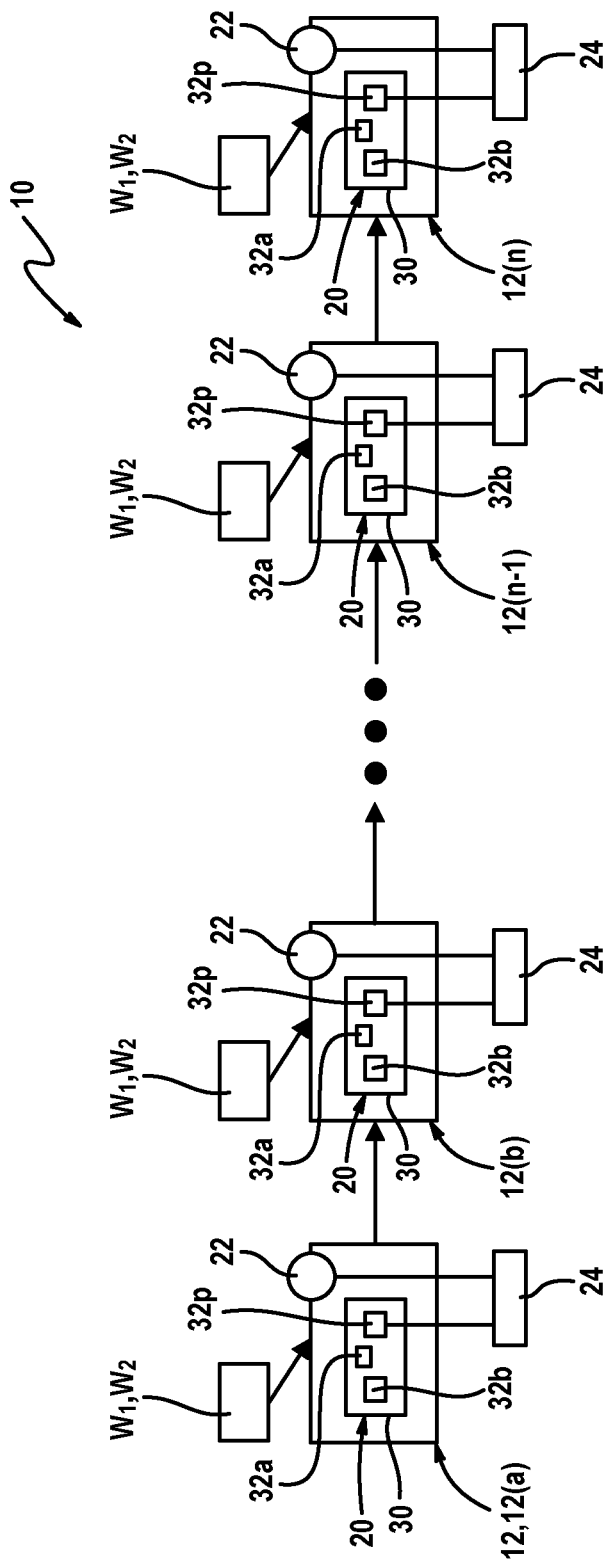
FIG. 1 is a schematic illustration of an exemplary manufacturing system constructed in accordance with the teachings of the present disclosure.

With reference to FIG. 1 of the drawings, an exemplary system for manufacturing an article is generally indicated by reference numeral 10. The manufacturing system 10 can include a plurality of workstations that are employed to form one or more portions of the article from various workpieces. The workstations can be collectively or generally designated by reference numeral 12, or can be referred to specifically by reference numerals 12(a), 12(b), . . . 12(n-1) and 12(n). Each of the portions of the article can comprise two or more workpieces (e.g., W1, W2) that have been joined together in one of the workstations 12. In the particular example provided, the workpieces form a lap joint that is joined or secured by welding, but those of skill in the art will appreciate that each workstation 12 could employ one or more joining techniques, such as welding (e.g., arc-welding, MIG welding, TIG welding, spot welding, resistance welding), bonding, riveting, fastening, nailing, brazing, soldering, etc. Additionally, those of skill in the art will appreciate that the particular joint need not be a lap joint, but could be any type of joint, including a butt joint or a mixed joint. Each workstation 12 can comprise a positioning fixture 20, a measuring device 22, and a workstation controller 24. As indicated above, the optimization algorithm for determining proper locator positions may be performed by the processor (not shown in FIG. 1) within controller 24, or by an auxiliary computer (not shown in FIG. 1).

Figure 2:
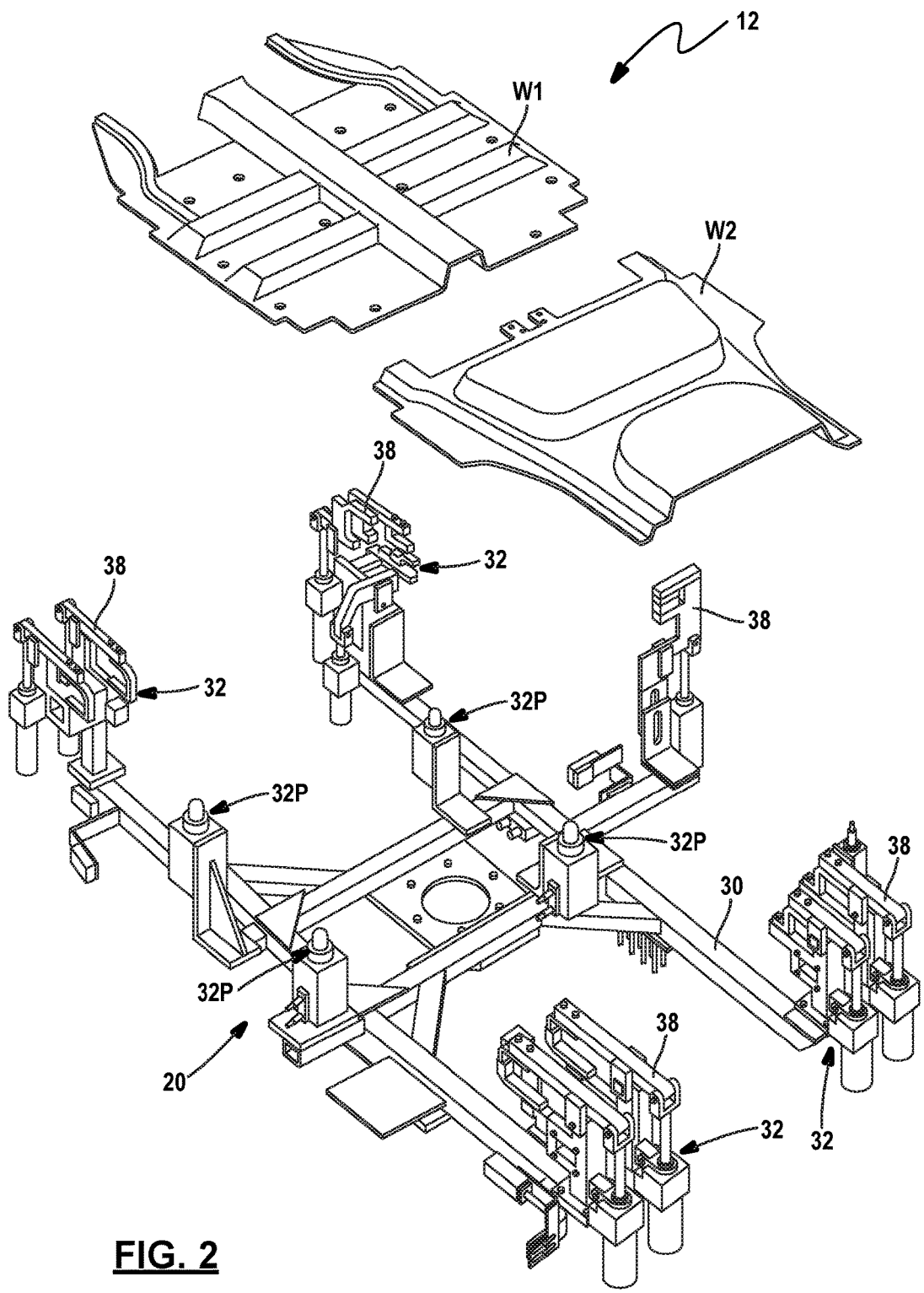
FIG. 2 is a perspective view of a portion of the manufacturing system of FIG. 1, illustrating an exemplary positioning fixture constructed in accordance with the teachings of the present disclosure.

With reference to FIG. 2, each positioning fixture 20 can be configured to hold one or more workpieces (W1, W2) so that the joining process can be conducted in the workstation 12. The positioning fixture 20 can have a frame (jig) 30 and a plurality of locators 32 that are configured to position one or more of the workpieces relative to the frame 30.

Depending on the configuration of the workpieces that are to be joined in the workstation 12, the locators 32 can be configured in one or more sets. Generally speaking, one set of locators 32 can be employed to locate a first workpiece relative to the frame 30 and another set of locators 32 can be employed to locate a second workpiece relative to the frame 30. It will be understood, however, that one or more of the locators 32 in one set of locators 32 could be employed to position two or more workpieces relative to the frame 30. As will be discussed in more detail below, the locators 32 will include at least one primary locator 32p. In some situations, a first workpiece can be positioned in a given workstation with a set of locators having no primary locators 32p, and each workpiece that is to be joined to the first workpiece in the given workstation can be positioned with a set of locators having two primary locators 32p. The locators 32 can be configured to engage one or more of the workpieces in a controlled manner to both locate the workpiece(s) in a desired manner and to eliminate translating movement along and rotational movement about X, Y and Z axes. One technique commonly employed in the design of positioning fixtures aims to constrain the degrees of freedom of a workpiece during a joining operation to ensure repeatable build. Such system is referred to as the 3-2-1 principal of fixture design. According to this design, the positioning fixture 20 is configured such that each workpiece:

a) rests on three non-collinear net contact blocks on a bottom surface (i.e., in an X-Y plane), which fixes the location of the workpiece in a first direction along the Z-axis, rotationally about the Y-axis, and in a first rotational direction about the X-axis;

b) rests on a four-way locating pin on a side (X-Z plane), which fixes the motion of the workpiece in both X-Y plane one direction along the X-axis and another around the Y-axis and in a first rotational direction about the Z-axis; and c) rests on one two-way locating pin on an adjacent surface (Y-Z plane) to fix the location of the workpiece in one direction along the Y-axis and in a second rotational direction about the Z-axis. Additionally, it will be appreciated that if the workpiece is not sufficiently rigid, more than three net contact blocks may be employed to reduce or eliminate deformation of the workpiece.

Each locator 32 is disposed at a corresponding one of the points on which the workpiece rests. The locators 32 can comprise rest buttons or pads, concentric locators and radial locators. Clamps 38 can be employed to secure the workpiece to the positioning fixture 20 to thereby inhibit translation of the workpiece relative to the positioning fixture 20 along the X, Y and Z-axes, as well as rotationally about the X-axis in a second rotational direction.

If desired, the locators 32 can be movably coupled to the positioning fixture 20 so as to be capable of being used for the production of different finished articles. For example, the locators 32 could be positionable in a first orientation to facilitate the joining of workpieces for a first finished article (e.g., the body-in-white of a sedan) and a second orientation to facilitate the joining of workpieces for a second finished article (e.g., the body-in-white of a sport-utility vehicle). The positioning of the locators 32 can be accomplished manually with assistance of results from the optimization algorithm, or preferably in an automated manner via an appropriate mechanism, such as one or more linear motors (not shown). Moreover, in situations where the locators 32 are moved in an automated manner, the positioning of the locators 32 can be controlled on an as-needed basis, so that workpieces for a variety of different finished articles could be processed together through the manufacturing system 10 (FIG. 1) without the need for significant down-time to re-tool the manufacturing system 10 (FIG. 1).

Figure 3:
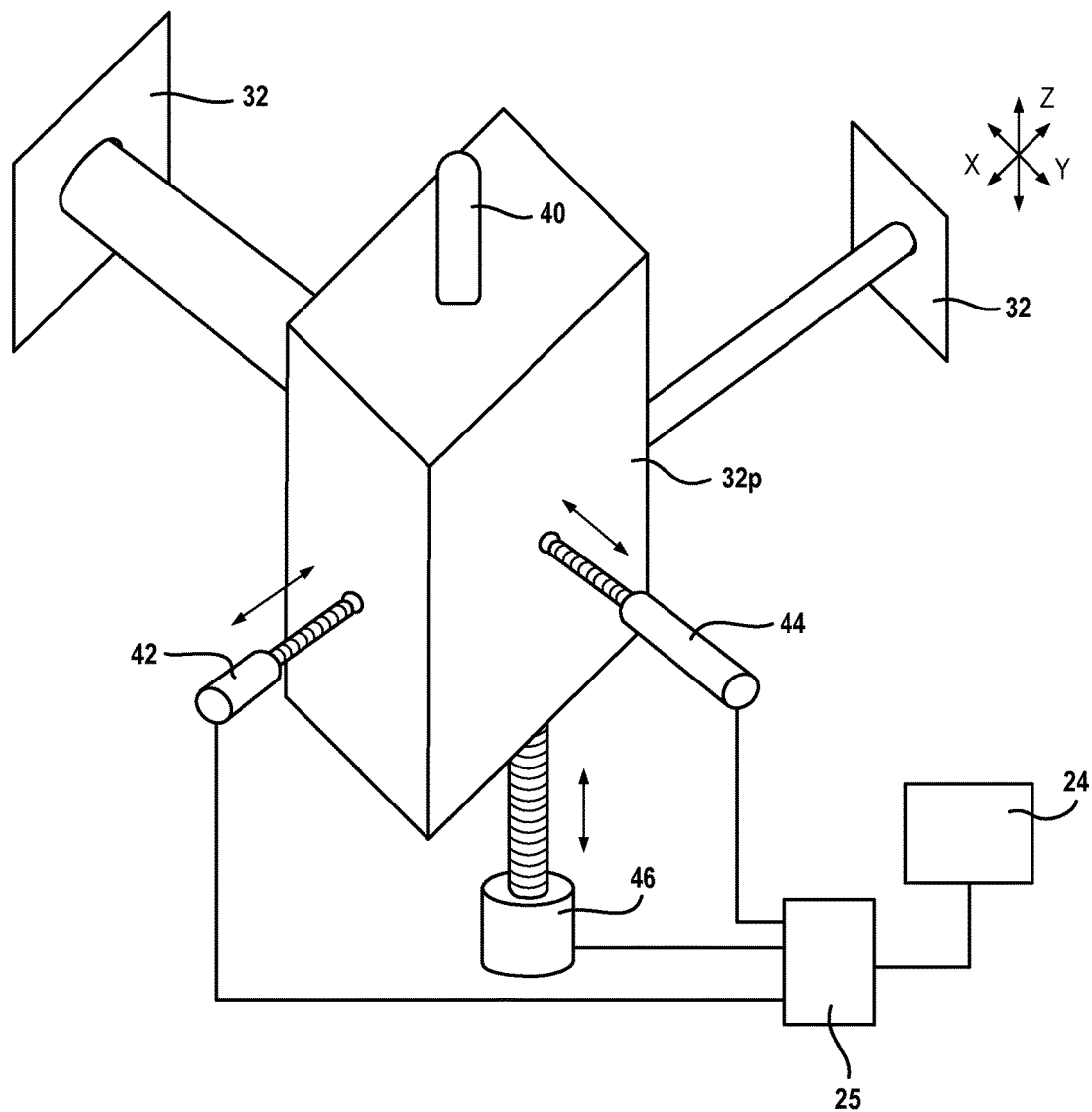
FIG. 3 is a schematic view depicting a portion of the positioning fixture of FIG. 2.

With reference to FIGS. 2 and 3, one or more of the locators 32, which can be a concentric locator or a radial locator, can be a primary locator 32$p$. In the particular example provided, the primary locator 32$p$ is a concentric locator and comprises a pin 40, as well as first, second and third linear motors 42, 44 and 46, that are driven by controller 24 through associated motor driver and power supply circuitry 25 and configured to translate the pin 40 along the X, Y and Z-axes, respectively, relative to the frame 30. It will be understood that the motor of the first, second and third linear motors 42, 44 and 46 can be coordinated to avoid binding the workpiece or breaking the locators. As is schematically depicted in FIG. 3, the pin 40 can optionally be fixedly coupled the one or more other locators 32 in a given set of locators (i.e., a "first set of locators" in the particular example provided) so that operation of the first, second and third linear motors 42, 44 and 46 can optionally move all or a portion of the locators 32 in the particular set of locators (i.e., as a group) along the X, Y and Z-axes. The first, second, and third linear motors 42, 44 and 46 are depicted as employing jack- or ball-screws in the particular example provided, but it will be appreciated that any type of linear motor could be employed, including those driven by servo and/or stepper motors.

In some situations, the positioning fixture 20 can be configured to have a quantity of primary locators 32$p$ that is one less than the quantity of workpieces that are to be joined in the workstation 12, and each of the primary locators 32$p$ can be associated with a different set of locators. It will be appreciated, however, that the quantity of primary locators 32$p$ employed in a particular positioning fixture 20 can be varied as desired. For example, a single primary locator 32$p$ could be employed if movement of one type (e.g., translation along the X, Y and/or Z axes) was desired, while two primary locators 32$p$ could be if more than one type of movement (e.g., translation and rotation) was desired.

Figure 4:
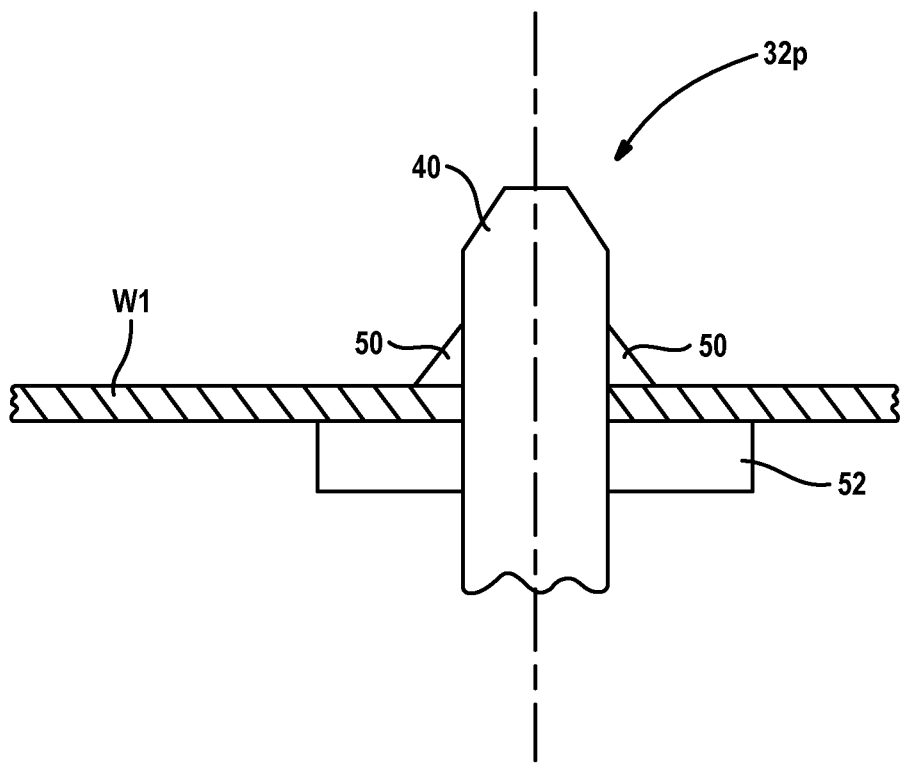
FIG. 4 is a schematic view depicting a portion of the positioning fixture of FIG. 2.

It will be appreciated that the purpose of the primary locators 32$p$ is to permit the set of locators 32 that control the positioning of one workpiece to be moved relative to the set of locators 32 that control the positioning of a second workpiece. Optionally, as shown in FIG. 4, the primary locator 32$p$ can include a pair of retractable clamping jaws 50 that are movable between a retracted position, which permits an associated workpiece W1 to be loaded onto the primary locator 32$p$, and an extended position that can be employed to urge the workpiece W1 against a shoulder 52 or rest button to thereby fix the workpiece W1 against the shoulder 52 or rest button to inhibit translation along and rotation of the workpiece W1 about (the pin 40) of the primary locator 32$p$.

Measuring Device(s)

Returning to FIG. 1, the measuring device 22 can be any type of device that is configured to collect data in real time relating to the physical positioning of various features on the workpieces when the workpieces are mounted on the positioning fixture 20 prior to the commencement of a joining operation. For example, the measuring device 22 can comprise a first device, such as a laser radar device or an optical measurement device, which is configured to collect 3-dimensional data relating to the workpieces, and an analyzing tool that can be employed to evaluate the 3-dimensional data and identify the size, shape and relative position of selected features on the workpieces.

In one contemplated embodiment, the measuring device 22 includes a laser (not shown), which can be in the form of a laser tracker (not shown), and initially collects data associated with the Z-axis of the first and second workpieces or a proxy thereof. This data is employed to "flatten" the first and second workpieces relative to a reference plane that is parallel to the X- and Y-axes. The "flattening" could be accomplished by generating an inverse matrix of values (i.e., Z values) along the Z-axis and moving the first and/or second workpieces as necessary to position them in a desired manner relative to the reference plane. Thereafter, the measuring device 22 could be employed to collect full 3-dimensional data that is employed to determine if the several features on the first and second workpieces are in their optimized location.

Performance of the method of the present disclosure in this manner may be beneficial in some situations (e.g., improve the ability of the measuring device 22 to collect full 3-dimensional data by presenting the first and second workpieces in a relatively consistent manner relative to the reference plane, reduce the time to calculate the optimized location(s), and/or reduce the complexity of the calculations used to determine the optimized location(s)).

It will further be appreciated that inspection stations could be employed to acquire 3-dimensional data on each of the first and second workpieces prior to their introduction into workstation. In its inspection station, the workpiece can be loaded into a fixture and clamped into place. A laser could be employed to collect Z-axis data used to "flatten" the workpiece as described above. Thereafter, a measuring device could be employed to collect 3-dimensional data of the workpiece.

As an alternative to measuring the workpiece at the workstation in real time, the workpiece can be measured in advance and its measurement data provided to the optimization algorithm when the workpiece is delivered. For example, the workpiece can be associated with a unique serial number that permits it to be associated with a data set that includes its 3-dimensional data. Alternatively, a read-write device, such as a radio frequency tag, can be coupled to the workpiece or a fixture/rack into which the workpiece is mounted and the 3-dimensional data for the workpiece can be written or saved to the read-write device. Data on the read-write device can be accessed from the read-write device when the workpiece or fixture/rack is sequenced into the assembly process.

The ability to gather 3-dimensional data on workpieces prior to placement of the workpieces in the assembly station a) permits non-conforming workpieces to be identified (and potentially removed or repaired) prior to entering the assembly workstation, and/or b) has the potential to reduce the complexity of the 3-dimensional data acquisition in the assembly workstation (because the 3-dimensional data of the workpiece is already known, only three points on the workpiece are needed to understand the orientation of the workpiece in the assembly workstation).

It will be appreciated that the "inspection" function could be performed at a separate station that feeds the workpieces to an assembly station, or could be performed at a location that is remote from the assembly line. For example, if the assembly line/assembly workstation is disposed in an assembly plant of an automobile manufacturer, the inspection station for the workpiece could be located at the facility of a supplier that manufactures the workpiece for the automobile manufacturer.

Analyzing Tool

In the particular example provided, the analyzing tool employs data from the first device in conjunction with data transformation techniques and pattern recognition techniques to identify one or more of the selected features. Each of the features can comprise a surface or edge of a workpiece, a datum on a workpiece, a hole or slot in a workpiece, etc. and is selected for its ability to influence variation in the finished article. In the particular example provided, the analyzing tool is employed to a) determine the magnitude of variances between actual feature dimensions (size, location, etc.) and associated nominal feature dimensions (as determined from blueprints or CAD data), b) determine if any of the actual feature dimensions is out of tolerance, and c) statistically analyze the magnitude of the variances to determine if the actual feature dimensions are in statistical control or out of statistical control. The statistical analysis can be employed to identify instances where one or more features are being manufactured in a non-ideal manner so that corrective action can be implemented to ensure that workpieces subsequently fed into the manufacturing system 10 are less apt to add significant variation into the finished article. It will be appreciated that the non-ideal manner of manufacture could be the manufacture of the feature in an out-of-tolerance manner, or could be the positioning or forming of the feature at a position or to a size that deviates from its nominal blueprint location or size.

Optionally, the measuring device 22 can be employed to identify features and/or components of the workpiece(s) and/or assembly that can be out-of-tolerance or otherwise non-conforming (e.g., incomplete or improperly assembled/fabricated) and generate an appropriate response, such as an alarm, flag or shut-down command, which can be used to prevent the out-of-tolerance/non-conforming workpiece or assembly from being used.

The workstation controller 24, or an auxiliary computer (not shown in FIG. 1) communicating with the controller 24, can receive data and information from the measuring device 22 and can employ the optimization algorithm to re-orient one or more of the workpieces relative to the other workpieces as desired. In this regard, the results of the optimization algorithm can be employed to operate the first, second and third linear motors 42, 44 and 46 (FIG. 3) to move one or more of the locators 32 in a desired manner.

Optimization Algorithm

Generally speaking, the optimization algorithm can determine two or more vectors that can be employed to control the movement of a workpiece to an optimized location. For example, two vectors can be employed where a first vector corresponds to rotation of the workpiece about an axis, and a second vector corresponds to translation of the workpiece in a plane. It will be appreciated that these two vectors could be employed in separate movements (i.e., sequentially) or may be combined in some situations so that rotation and translation corrections could be implemented simultaneously. The optimization algorithm can also coordinate the movement of the primary locators $32p$ for a given workpiece to prevent binding of a workpiece on a fixture or the breaking of one or more of the locators 32, and can perform a mapping function that identifies the (new) position of one or more of the features after the primary locator(s) $32p$ have moved the workpiece(s).

More specifically, the optimization algorithm is implemented by a processor, such as a processor within the controller 24, or by a processor within an auxiliary computer that communicates with the controller 24. The processor 80, shown diagrammatically in FIG. 11 has associated computer-readable memory 82 that is configured according to predefined data structures designed to hold the supplied computer-aided design (CAD) data, the workpiece measurement data, and other calculated data used by the optimization algorithm 84, shown.

Figure 11:
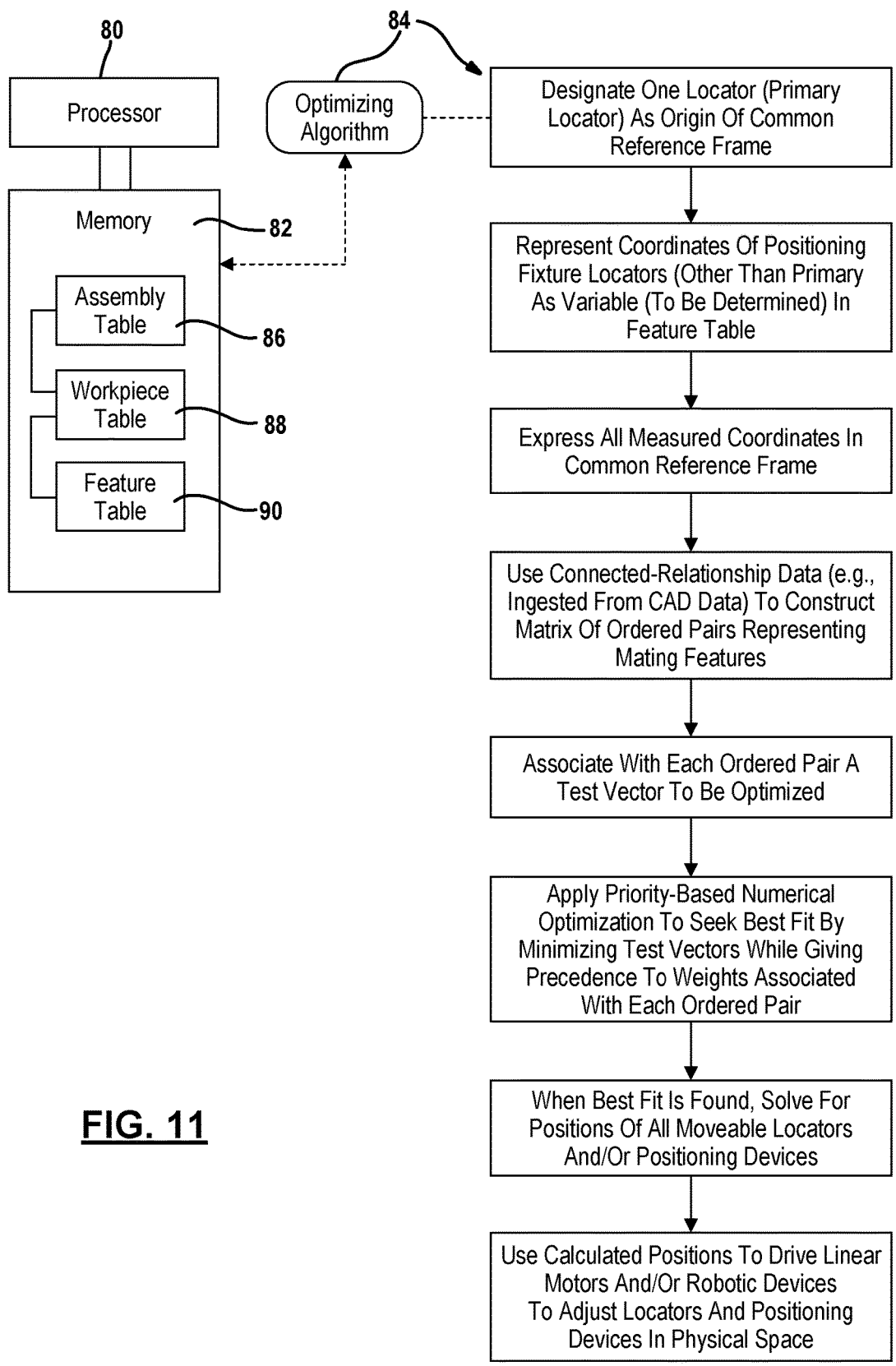
FIG. 11 is an exemplary hardware diagram also illustrating an optimization algorithm by which the position of the locators and/or robotic positioners is driven.

While different data structure implementations are possible, the data can be beneficially allocated to a plurality of data tables, three being illustrated in FIG. 11: assembly table 86, workpiece table 88 and feature table 90. In most manufactured articles there is a one-to-many relationship (1 . . . n) between a record in the assembly table, and the constituent workpiece component records stored in the workpiece table. In other words, an assembled article is typically made up of one or more workpiece components. Similarly there is typically a one-to-many relationship (1 . . . n) between each workpiece and the individual features found on that workpiece. In other words, each workpiece will typically have one or more features, such as edges, corners, locating holes, surface features and the like.

Figure 12:
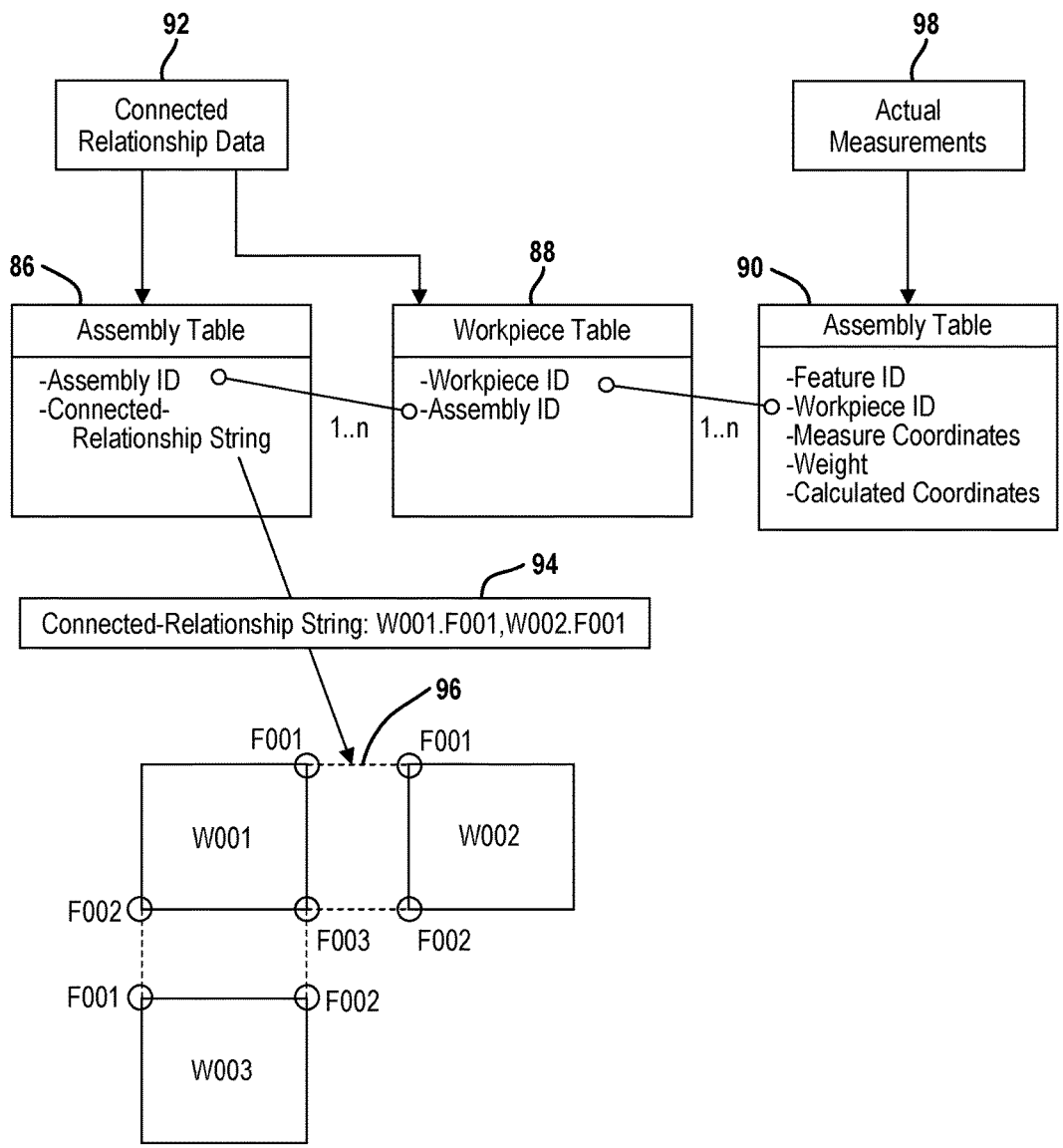
FIG. 12 is a data structure diagram useful in understanding how the processor can be programmed to store and manipulate data used to mechanically position the locators and/or robotic positioners.

FIG. 12 shows the exemplary data structure in greater detail. It will be appreciated that FIG. 12 is intended merely to aid in understanding the optimization algorithm and is not intended to be an exhaustive and detailed representation of all data that might be stored in an actual implementation. The assembly table 86 stores, for each assembly or article to be manufactured, a collection of records representing the connected relationships among the plurality of workpiece components that make up the finished assembly or article. These connected relationship data can be obtained, for example, by ingesting data from the computer-aided design (CAD) files 92 as developed by product engineers of the assembly or article. As another alternative, the connected relationship data could be obtained from a master component that is considered to dimensionally accurate. To allow the assembly table to accommodate multiple different articles (e.g., different models or different products), the records may each be tagged with an assembly ID that is unique for that article. Thus the assembly table can store plural sets of connected relationship data for a plurality of different articles or products.

While the actual representation of each connected relationship may vary based on the implementation, to illustrate the concept, FIG. 12 shows the connected relationship may be represented as a connected-relationship string that identifies a feature location on a first workpiece that mates with a feature location on a second adjoining workpiece. In FIG. 12, feature F001 of workpiece W001 mates with feature F001 of workpiece W002, as at 96. Thus, the connected-relationship string may contain the following representation of this adjoining relationship as the following ordered pair: (W001.F001, W002.F001). Again, it will be understood that this particular ordered pair representation is intended merely to illustrate the concept of how two features can be designated as being mated or proximate features in a finished article. Other representations are also possible.

The workpiece table 88 stores a list of the workpieces required to assemble a finished assembly or article. Thus workpiece table 88 stores records that link the assembly ID to a workpiece ID. The workpiece table 88 thus serves as a linking table to correlate information stored in the assembly table 86 with information stored in the feature table 90. The feature table 90 assigns a unique feature ID to each feature and associates that feature to its corresponding workpiece, via the workpiece ID.

The feature table 90 is initially populated with actual measurement data 98, obtained using cameras, laser measurement systems and the like. Specifically, from actual measurements taken of an individual workpiece, the relevant features (e.g., points, edges, holes, surface features) are extracted using machine vision or image analysis and the locations of these relevant features are stored as measured coordinates in the feature table 90. Note that these measured coordinates can be expressed with respect to a reference frame associated with the workpiece being measured. Alternatively, if desired, the measured coordinates can be expressed with respect to a reference frame associated with the workstation's positioning fixture into which the workpiece is or will be mounted.

In addition to the measured coordinate data, the feature table 90 is also populated with a weighting value, for each feature (i.e. each record) in the feature table. These weighting values are used by the optimization algorithm to control which feature-to-feature relationships need to be tightly constrained, and which can be relaxed. By allowing weighted control over which relationships dominate the assembly, the processor is able to calculate an optimal assembly solution that respects the design engineers' overall vision for the assembled article. Car doors fit properly; engine mounts balance the engine for minimal vibration; less critically positioned components take up the slack.

The feature table 90 also stores calculated coordinates for each of the features. Initially these calculated coordinate data are unpopulated. The optimization algorithm uses these calculated coordinates storage locations to store the intermediate and ultimately the final calculated values where each of the features need to be in the final optimized assembly solution.

The feature table 90 stores all features that are pertinent to the assembly. These features include all feature points or structures that need to mate with the feature points or structures of adjacent workpiece parts. These features also include all locator pins, locator holes and other locator surfaces that are used to line up the workpiece with the mating locator found on the positioning fixture. Thus, in addition to workpiece feature data, the feature table also stores feature location data of the positioning fixture or fixtures used during the assembly process. This includes the location of all locator pins, or other locator structures found on the positioning fixture.

If not already expressed relative to a common reference system, the optimization algorithm performs any necessary coordinate translation so that all coordinate stored as calculated coordinates are expressed relative to a common reference system, such as the reference system of the positioning fixture. In this regard, typically one locator within the positioning fixture is designated as the primary locator. This primary locator is typically held stationary (i.e., not adjusted by the processor controlled linear motors) and may serve as the origin point (0,0,0) of the common reference system.

Referring to FIG. 11, the processor 80, accesses the data structures within memory 82 and performs the optimizing algorithm 84 that applies the following steps:

1. Designate the origin of the common reference frame about the fixture and store its location in the feature table as the origin (0,0,0). It will be understood that the reference frame may be in a different position. For example, the global coordinate system for a car can be placed outside the boundary of the fixture and in such a case, the algorithm can take that into account and can map a transformation matrix of the coordinates into the common fixture frame (i.e., pin locators).
2. Represent the coordinates of the positioning fixture locators as variables (to be determined) in the feature table.
3. Express all measured coordinates in the common reference frame; preferably this common reference frame is that of the workstation positioning fixture. This can be accomplished by either acquiring the measured coordinates using a camera system or measuring device that is calibrated to the common reference system. Alternatively, this can be accomplished by performing matrix transformation of the measured coordinates in workpiece reference frame into the common reference frame.
4. Using the connected-relationship data stored in the assembly table (e.g., ingested from the CAD data), construct a matrix of ordered pairs to represent each pair of mating features of the assembly and store as initial calculated coordinates in the feature table. In the constructed matrix, each calculated coordinate is represented by a test vector of yet to be determined length and direction, the vector having its head coincident with one of the mating features and its tail on the other of the mating features. See FIG. 13.
5. Through an optimization process using priority-based numerical optimization that takes the stored weighting values into account, computationally iterate through one or more iterations to computationally seek the best fit, giving precedence to points of higher weight, such that the lengths of all test vectors are minimized. It's worthy to note this algorithm is not an averaging algorithm. It has the ability to prioritize features based on importance to the build process and the end-user.

6. When the best fit is found, solve for the positions of all movable locators or positioning devices (e.g., robotic arms).

7. Use the calculated positions of the moveable locators and positioning structures to drive the linear motors to adjust the locators and positioning devices in physical space.

Figure 13:
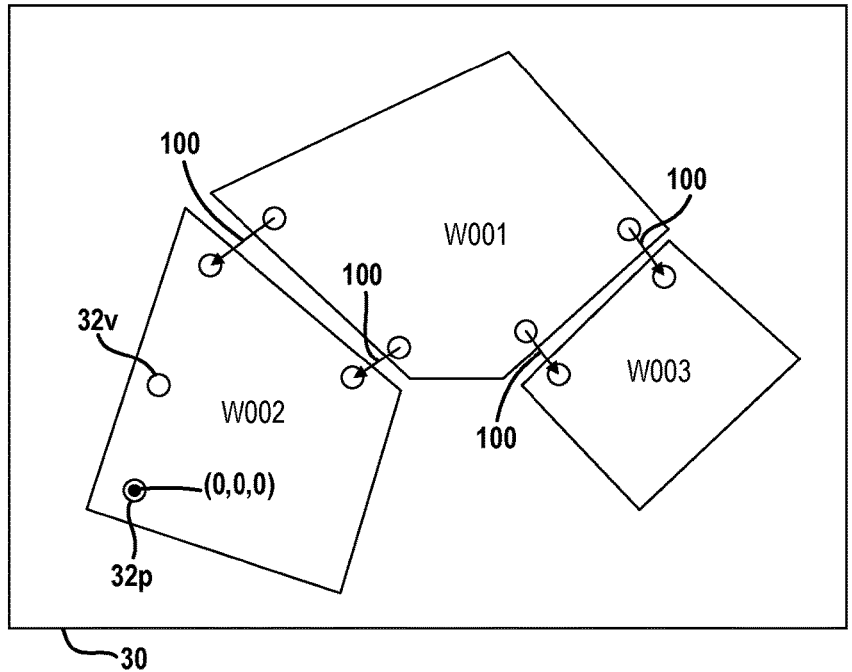
FIG. 13 is a vector diagram useful for understanding how the optimization algorithm of FIG. 11 manipulates connected relationships among features of respective workpieces.
Figure 14:
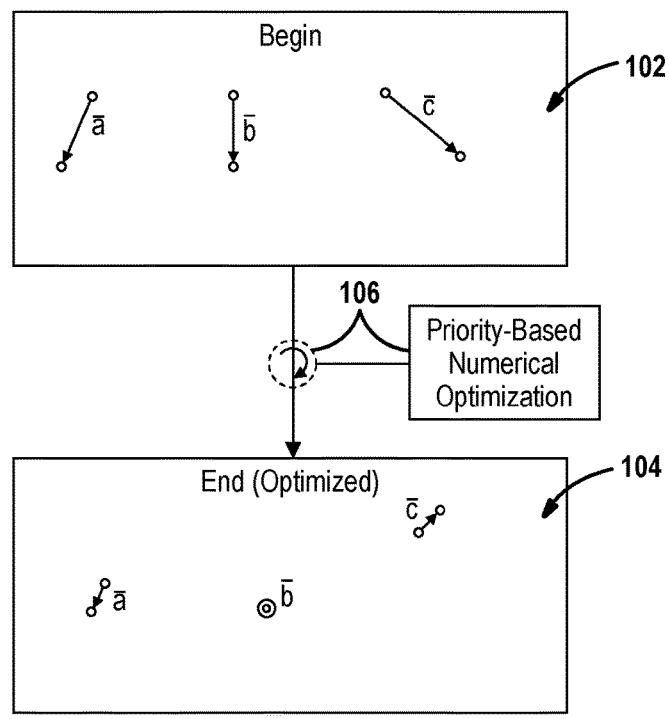
FIG. 14 is a vector diagram useful for understanding the optimization algorithm.

FIGS. 13 and 14, show how the optimization algorithm exploits the test vectors to seek the optimal solution. In FIG. 13, three exemplary workpieces, W001, W002 and W003 are laid out in virtual space, with their respective features (in this case represented by small circles) are aligned approximately adjacent to each other. Between each pair of mating features, a test vector 100 is defined stored in virtual space within processor memory 82. Because each workpiece is represented in the common coordinate frame, each of these test vectors is referenced to the origin point of the coordinate system. For this example, we shall assume that workpiece W002 is oriented on the positioning fixture by being physically attached to the primary locator 32p, which serves as the origin (0,0,0). Each other feature remains of unknown position until the optimization algorithm is run. This includes the position of locator 32v, which corresponds to one of the motor-driven variable locators.

When the optimization algorithm is run, a solution is calculated that minimizes the length of all of the test vectors (by utilizing the 3-dimensional measured data and ideal data), taking individual weighting of each pair of mating features into account. The effect is to determine the final location of all features in the optimal arrangement. This has been diagrammatically illustrated in FIG. 14. FIG. 14 at 102 shows the condition of three exemplary test vectors a, b and c before any optimization is performed. The test vectors each have a direction and length sufficient to connect its respective pair of mating points. Because no optimization has been performed at this stage, these test vectors may be of any length and of any direction.

As the priority-based numerical optimization algorithm 106 is run—possibly iteratively or recursively a number of times—the optimal lengths and directions of test vectors a, b and c are ultimately arrived at as shown at 104. Note in this example, test vector b has received highest weighting priority, resulting in its associated pair of mating points now being coincident. The other test vectors a and c have been shortened in length, although not as much as vector b. Note that for this particular example test vectors a and c have received adjustment in pointing direction as well.

Essentially, the optimized change in length and direction of the test vectors corresponds to a shift in the three-dimensional position and rotation of the workpieces to which the corresponding features are associated. Once the optimized solution (illustrated in 104) is achieved, the optimized positions of all features are fixed in reference coordinate space. That is, the position of each feature can be determined by first establishing the locations relative to the origin (0,0,0) of the workpiece associated with the primary locator 32p (in this case workpiece W002). Then the locations of the mating points on other adjacent workpieces are determined by vector addition, using the optimized test vectors.

As noted above, once the best fit for the workpieces have been determined in virtual space, the process can now solve for the required coordinates of the moveable locator pins and either automatically move those pins to proper locations, or provide detailed instructions to assist a worker in doing so.

Having thus presented an explanation of the optimization algorithm, use of the overall system can now be discussed.

Joining Workpieces Using Variable Position Locators

Figure 5:
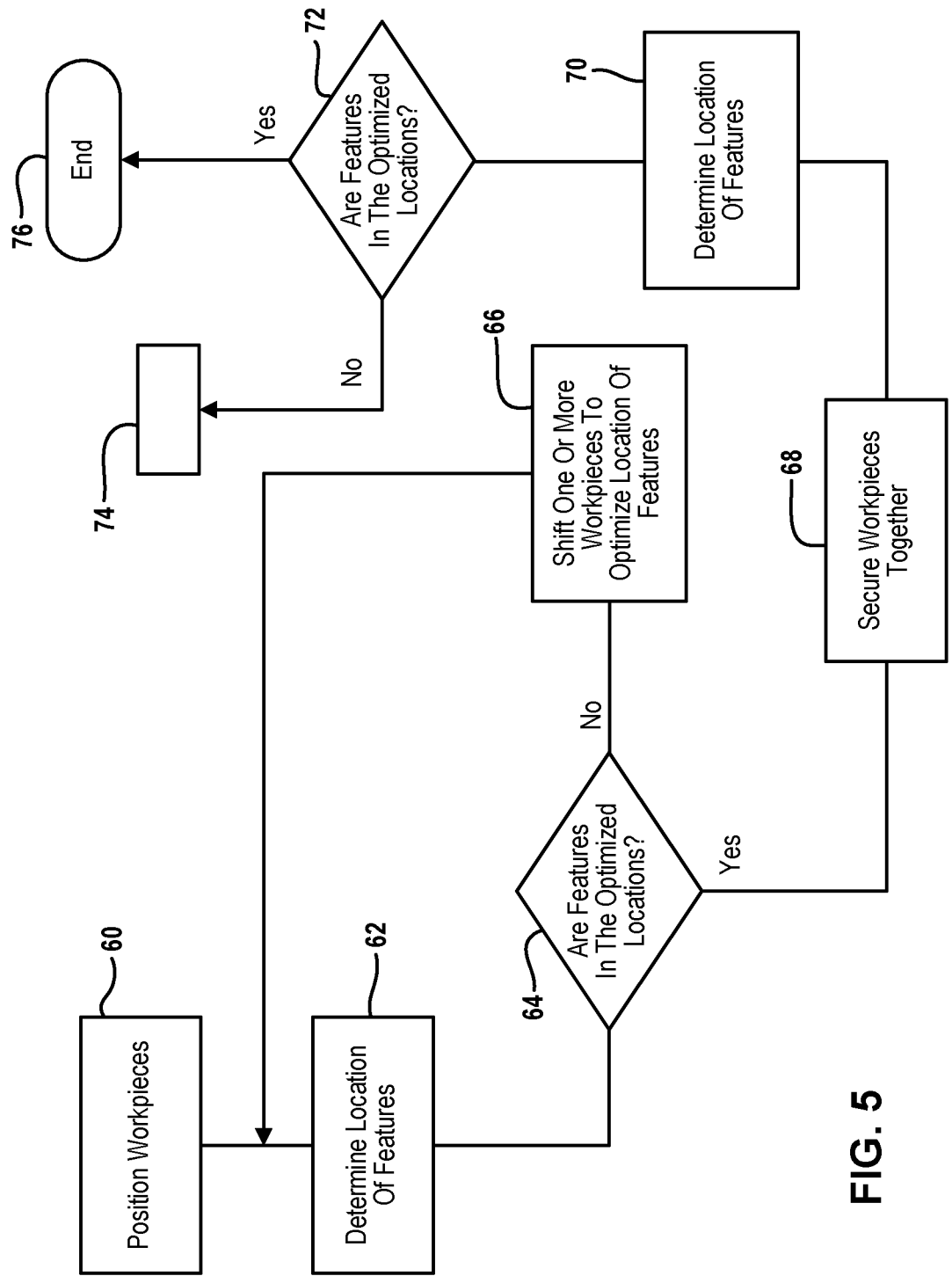
FIG. 5 is a schematic illustration of an exemplary process for joining workpieces in accordance with the teachings of the present disclosure.

With reference to FIG. 5, an exemplary method for performing a joining operation at a given workstation 12 (FIG. 1) is schematically depicted. The method can begin at step 60, where a first workpiece and a second workpiece are mounted on first and second sets of locators 32a and 32b (FIG. 1), respectively. At this initial stage, each of the primary locators 32p (FIG. 1) associated with the first set of locators 32a (FIG. 1) is positioned relative to the second set of locators 32b (FIG. 1) by an associated set of the first, second and third linear motors 42, 44 and 46 (FIG. 3) at an initial position. Clamps (not specifically shown) can be operated to secure the first and second workpieces to the frame 30 (FIG. 1).

The method can proceed to step 62, where the measuring device 22 (FIG. 1) can collect and analyze 3-dimensional data regarding selected features on the first and second workpieces. In the particular example shown in FIG. 6, which depicts a door D for an automotive vehicle, the features comprise first and second pairs of hinge mount holes HM1 and HM2, respectively, a pair of latch mount holes LM, and a datum line DL.

Returning to FIGS. 1 and 5, the method can proceed to decision step 64 where control (e.g., the workstation controller 24) can determine if the several features are in their optimized location. If not, the process proceeds to step 66 where the optimization algorithm is performed. Specifically, if the features are not in their optimized locations, the method can proceed to step 66 where the primary locator 32p (with the associated set of locators 32) can be moved by the first, second and third linear motors 42, 44 and 46 (FIG. 3) as required to position the first workpiece at a location that positions the features on the first and second workpieces at their optimized locations. The method can loop back to step 62, which permits the measuring device 22 to confirm the positioning of the features in their optimized locations (within predefined limits) and to permit the workstation controller 24 to confirm that the optimized locations have not changed.

If at decision step 64 the features are in their optimized locations, the method can proceed to step 68 where the workpieces can be secured together. In the example provided, the workpieces are joined via a MIG welding process, but as noted above, other joining processes could be employed in the alternative. The method can proceed to step 70, discussed in the Assessing Manufacturing Tolerances and Refining Manufacturing Process section below.

Further Discussion of Weighting Function

For purposes of this methodology, an optimized location of the features is the positioning of the first and second workpieces in a manner that minimizes the effect that the features of the first and second workpieces have on the magnitude of the variation in the fabrication of the article. Note that the optimized location of the features is not necessarily the location that minimizes the variation between the nominal location of each feature and the actual location of each feature, as in a least squares regression analysis. In our experience, the several features will have differing levels of influence on the magnitude of variation in the fabrication of the article and consequently, thus the processor employs a weighting technique within the optimization algorithm, as discussed above.

Figure 6:
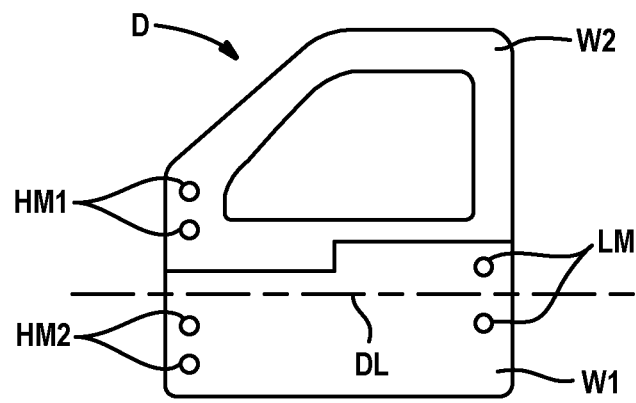
FIG. 6 is a schematic illustration of an exemplary assembly that is formed of workpieces that are to be joined in a workstation of the manufacturing system of FIG. 1.

To illustrate how weighting comes into play, refer to the example of FIG. 6. In FIG. 6 a pair of hinges (not shown) shall be mounted to the door D via first and second pairs of hinge mounting holes HM1 and HM2. Further, a latch (not shown) shall be mounted to the door D via the pair of latch mount holes LM. Some of these holes may be configured with a relatively large degree of compliance (e.g., the holes in a first one of the hinges and the latch that receive fasteners that are threaded into the second hinge mount holes HM2 and latch mount holes LM are relatively larger in diameter than the fasteners). The other one of the hinges shall be mounted to the door D via the first pair of hinge mount holes HM1 and is configured with a relatively smaller degree of compliance (i.e., the holes in the other one of the hinges is sized relatively closer to the threaded fasteners that are threaded into the hinge mounting holes HM1). According to the desired end result, the datum line DL is critical to the gap-and-flush fit of the door D to the remainder of the body (not shown) of the automotive vehicle. In this example, the datum line DL is given a first weight (e.g., a weight of one (1.0)), the first hinge mount holes HM1 is given a second, smaller weight (e.g., a weight of one-half (0.5)), while the second pair of hinge mount holes HM2 and the latch mount holes LM are each given still smaller weights (e.g., a weight of one-tenth (0.1)). Accordingly, the several features can be prioritized in the optimization algorithm such that the feature or features that most influence the magnitude of variation in the article can be oriented as close as possible to their nominal positions to thereby reduce the magnitude of variation in the article.

Figure 7:
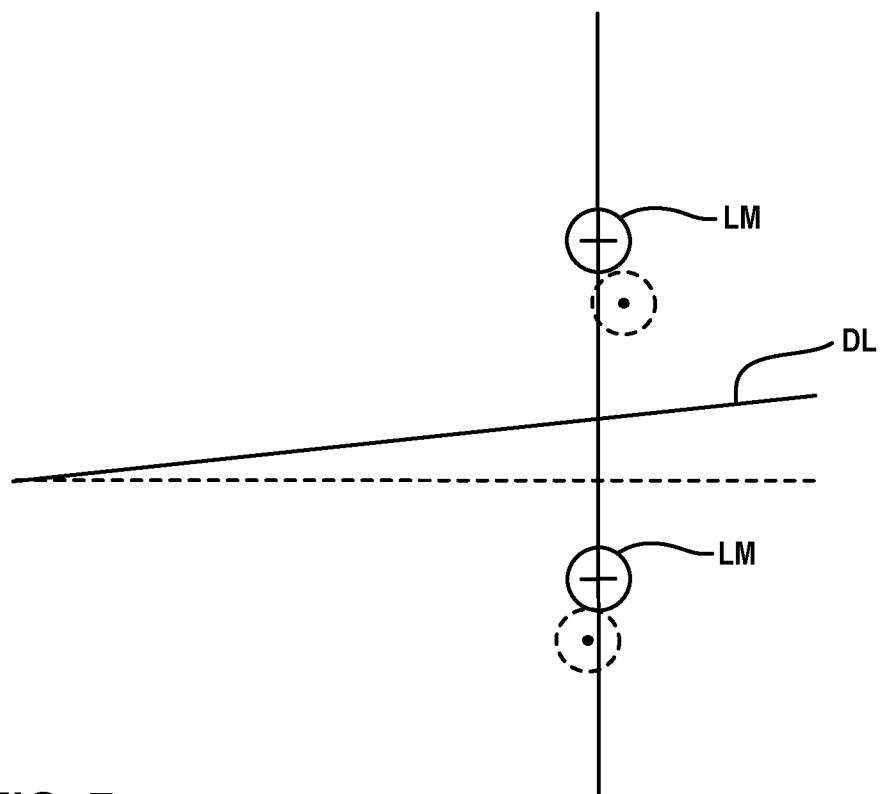
FIG. 7 is an enlarged portion of FIG. 6 that depicts a first orientation of selected features on a workpiece and a revised orientation of the selected features that is obtained through an optimization algorithm.

In some situations, the weighting could cause one or more of the features to be moved away or further away from their nominal position(s). In the example of FIG. 7, the latch mount holes LM are originally located at their nominal locations, but due to the priority associated with the location of the datum line DL, the workpiece W1 can be moved somewhat to re-orient the datum line (to the position that is depicted in broken line), which can move the hinge mount holes HM (to the positions shown in broken line) away from their nominal positions. In severe instances, one or more lower weighted features could actually be moved into a position that is actually considered out-of-tolerance but which nevertheless permits the first and second workpieces to be joined and functionally integrated into the article. For example, if second pair of hinge mount holes HM2 were to be positioned within +/−0.5 mm from their nominal position, but were positioned +0.6 mm from their nominal position due to the prioritization of the datum line DL, the optimization algorithm would permit the configuration if there was sufficient compliance between the hinge and the second pair of hinge mount holes HM2 to permit the door D to be mounted to the remainder of the vehicle body such that the door D opened, closed and latched properly and all criteria associated with the gap-and-flush fitting of the door D to the remainder of the vehicle body could be satisfied. One key to obtain the maximum benefit of the optimization algorithm is to appreciate that some tolerances may be somewhat arbitrary and that an out-of-tolerance situation for one feature does not necessarily render the article defective or inoperative. It will be appreciated, however, that limits could optionally be placed on the optimization algorithm that would not permit the location of one or more features to be positioned at an out-of-tolerance position.

Virtual Build Techniques

The optimization algorithm can be used to optimize the locations of features on adjoining workpieces by taking into account not only the positions of features on the workpieces to be joined at a particular workstation, but also the positions of features on workpieces that will be added at a later manufacturing stage, or at a different workstation. Thus, for example, although only three workpieces and eight feature points, plus locator pins are considered in the example of FIG. 13, the optimization process performed to shorten the test vectors 100 can take into account constraints imposed by other workpieces that are not currently being joined at this workstation. Thus for example, workpiece W001 may have another set of features used to join that workpiece to another workpiece (not shown). The optimization algorithm can take these other features into account in arriving at the solution for where to locate the variable pin 32*v*.

If desired, the entire product, made up of many components, subassemblies and workpieces can be modeled and used as data for the optimization algorithm. Doing this will help ensure that all of the components will ultimately fit together optimally, even if the joining is performed at different workstations.

In essence, one can consider every manufacturing process as comprising a virtual build. In the simple case, the entire virtual build is optimized using the optimization algorithm and then used to perform the physical build at a single workstation. Two parts might be joined together in this fashion. In the complex case, the virtual build is optimized, possibly for many hundreds of features, and the results are used to perform the physical build at multiple workstations, operating in serial or parallel, or both.

When using virtual build techniques involving many components, subassemblies and workpieces, and involving multiple workstations or build operations, the optimization process may be adapted to account for variability that may creep in as individual subassemblies are joined. To do this, the measuring devices 22, discussed above, can be used to take fresh measurements to determine the actual location of features of subassemblies after they have been joined. These are stored in the feature table and used when performing the optimization algorithm.

Considering Whether Workpieces are Independent or Dependent

Figure 8:
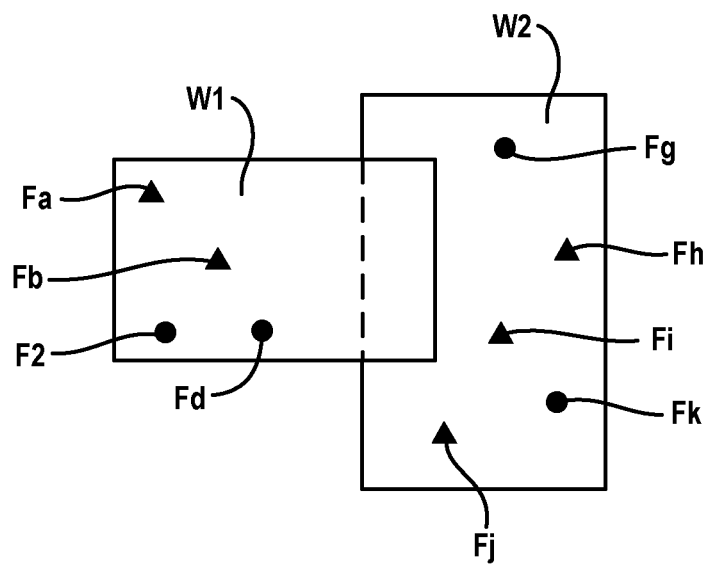
FIGS. 8 and 9 are schematic depictions of workpieces that are to be joined in the manufacturing system of FIG. 1, the workpieces being depicted as having independent and dependent relationships, respectively.
Figure 9:
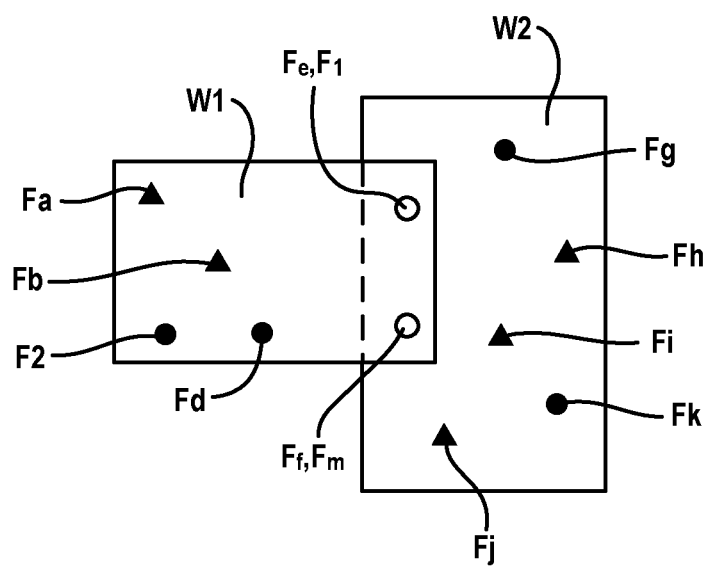

With reference to FIGS. 8 and 9, another factor in maximizing the benefit of the optimization algorithm concerns identifying or determining whether the workpieces that are to be joined are "independent", which is shown in FIG. 8, or "dependent", which is shown in FIG. 9. In both examples, two sets of locators (not specifically shown) are employed, with a first set of the locators being employed to position a first workpiece W1 and a second set of the locators being employed to position a second workpiece W2. In these situations only one primary locator (not shown) is required, but it will be appreciated that one or more additional primary locators could be integrated into the first set of locators and/or the second set of locators.

With reference to FIG. 8, an independent situation is depicted in which the features on one workpiece (e.g., the features Fa, Fb, Fc and Fd on the first workpiece W1) are able to be positioned relative to the features on a second workpiece (e.g., the features Fg, Fh, Fi, Fj and Fk on the second workpiece W2) without causing movement of the second workpiece W2. In the example provided, a portion of the first workpiece W1 overlies a portion of the second workpiece W2 and the two workpieces W1, W2 are joined together via a lap weld. The first workpiece W1 can be positioned independently of the second workpiece W2 so that the features Fa, Fb, Fc and Fd can be collectively oriented in a desired manner without movement of the second workpiece W2 or the features Fg, Fh, Fi, Fj and Fk.

With reference to FIG. 9, a dependent situation is depicted in which independent movement of the features on one workpiece (e.g., the features Fa, Fb, Fc, Fd, Fe and Ff on the first workpiece W1) relative to the features on a second workpiece (e.g., features Fg, Fh, Fi, Fj, Fk, Fl and Fm on the second workpiece W2) is limited by an interaction between at least one of the features on the first workpiece W1 and at least one of the features on the second workpiece W2. In the example provided, a portion of the first workpiece W1 overlies a portion of the second workpiece W2 and the first and second workpieces W1, W2 are secured to one another via a lap weld. Unlike the prior example, however, the features Fe and Ff on the first workpiece W1 and the features Fl and Fm on the second workpiece W2 are holes that are to be aligned to one another to receive threaded fasteners (not shown) therethrough that permit the joined first and second workpieces W1 and W2 to be mounted to a portion of the vehicle body. In this situation, movement of the first workpiece W1 relative to the second workpiece W2 is limited by a number of factors, including the amount of clearance between the holes and the threaded fasteners and the location of the holes in the vehicle body that receive the threaded fasteners.

Data Feed-Forwarding

Data regarding the optimized locations can be employed for feedforward and trend analysis. Feedforwarding of the data permits coordinates associated with the optimized locations to be fed between stations and/or to re-set the "home" position of a station.

While the method has been described as comprising a series of discrete steps that are performed sequentially, it will be appreciated that the method could be performed somewhat differently. For example, portions of the method described above in conjunction with steps 62 through 66 could be intermixed and/or performed at multiple stations.

Assessing Manufacturing Tolerances and Refining Manufacturing Process

With reference again to FIG. 5, although the workpieces have been secured at step 68, the process may continue through steps 70-76 in order to gather data on and assess manufacturing tolerances, as an aid to refining and improving the overall manufacturing process.

Thus in step 70 the measuring device 22 can be employed to determine the locations of the features. The method can proceed to decision step 72.

In decision step 72, control determines whether the features are in their optimized locations within predefined tolerances. If the features are not in their optimized locations within the predefined tolerances, the method proceeds to step 74 where the assembly (i.e., the joined workpieces) are identified as being non-compliant. Such pieces may be scrapped or reworked as necessary.

Returning to decision step 72, if the features are in the optimized locations with the predefined tolerances, the method proceeds to step 76 where the method ends and all collected data are stored for later process improvement. The assembly is considered to be compliant with tolerances and can be fed into a subsequent workstation as part of the subsequent steps for fabricating the article. It will be appreciated that the positions of the primary locators 32*p* can be returned to a "home" or "nominal position" after the joined assembly has been removed from the fixture. Optionally, the positions of the primary locators 32*p* can be left at their current positions.

Multi-step Fabrication Using Plural Workstations

Figure 10:
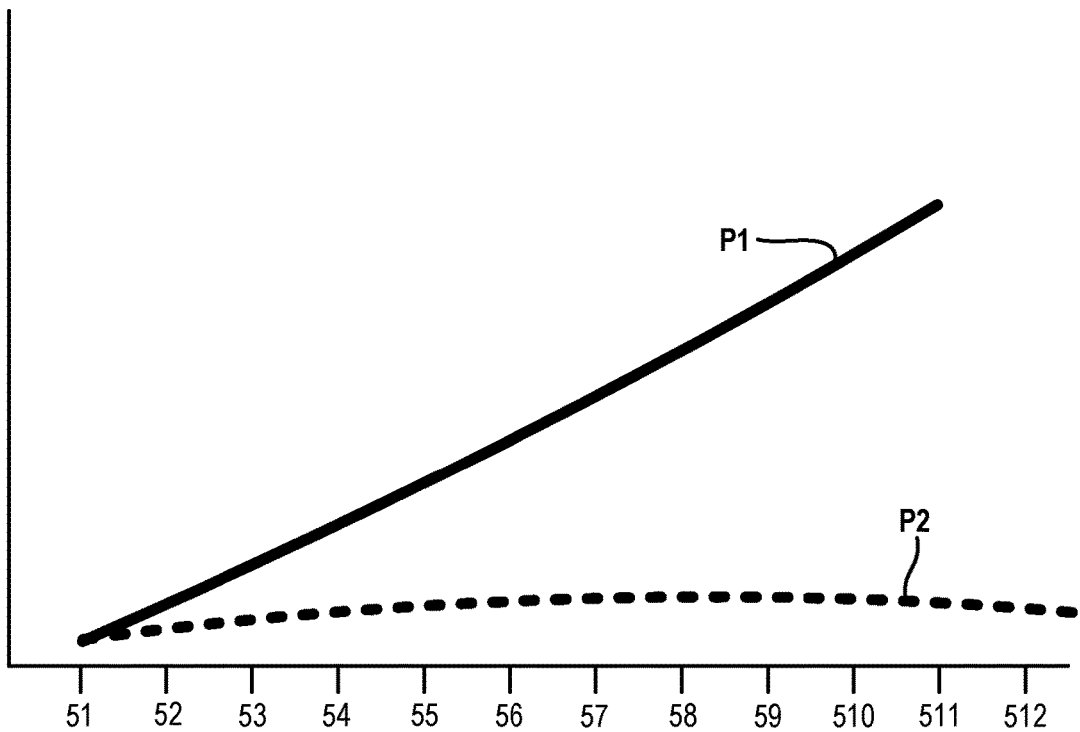
FIG. 10 is a plot that depicts the propagation of variation in the fabrication of an article.

With reference to FIG. 10, a first plot P1 and a second plot P2 are employed to illustrate variation created in a prior art multi-step fabrication process and a multi-step fabrication process in accordance with the teachings of the present disclosure, respectively. A prior art system for fabricating an article is configured in a manner that seeks to position each pair of workpieces that are to be joined at predefined positions (e.g., their nominal positions) prior to the joining operation. Fabrication of the article in this manner produces variation (due to deviations in the tooling that is employed to fixture and orient the workpieces, as well as deviations in the workpieces themselves) that is compounded at each subsequent step of the fabrication process as depicted by the first plot P1 and as such, the magnitude of the variation that is possible in the finished article can be relatively large if there are many steps to the fabrication process and/or if the article is relatively complex in its configuration, such as a body-in-white. In contrast, the fabrication system of the present disclosure seeks to position each pair of workpieces that are to be joined in a manner that minimizes the magnitude of variation in article. In this regard, the several workpieces in a workstation can be positioned in optimized locations to eliminate variation caused by deviations in the tooling that is used to fixture and orient the workpieces, as well as to reduce variation caused by deviations in the workpieces themselves. Accordingly, variation created in one workstation can be attenuated in a subsequent station as shown in the second plot P2 and consequently, the magnitude of variation that is possible in the finished article is significantly reduced as compared to the prior art multi-step fabrication process.

It will be appreciated that the location optimizing technique that is employed in the workstations of the manufacturing system 10 (FIG. 1) can eliminate the effect of tooling wear on the fixturing that is used to position the workpieces, can eliminate the production of assemblies that are not fit for use in the finished article through real-time monitoring of the features of the workpieces before the joining operation, can reduce scrap by permitting the use of some workpieces having one or more out-of-tolerance features, and can improve the overall quality of the finished article relative to a conventional joining operation that seeks to orient workpieces in their nominal positions prior to joining the workpieces.

While the manufacturing system 10 (FIG. 1) has been described as employing a plurality of workstations 12 (FIG. 1), each having a positioning fixture 20 (FIG. 2) that includes a jig or a frame 30 (FIG. 2) and at least one primary locator 32*p* (FIG. 2), it will be appreciated that a portion of the jig or frame 30 (FIG. 2) could be coupled to or integrated with a robot (i.e., the end effector of a robot) and that the robot could be employed to vary the position of an associated workpiece in 3-dimensional space as needed. Configuration in this manner essentially integrates a set of the locators 32 (FIG. 2) with portion of the jig or frame 30 (FIG. 2) so that the motors that are employed to position the robot are substituted for the linear motors and move (as a group) the portion of the jig or fixture and an associated set of locators.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a multi-piece assembly by joining mating workpieces in a workstation, the workstation having a frame with at least one fixed locator and at least one adjustable locator, wherein each workpiece has at least one physical feature, the position of which within the multi-piece assembly is expressed in a collection of assembly data, the method having a processor coupled to the workstation and one or more hardware-based fixtures that are mechanically operated and/or electronically controlled by the processor, comprising:

placing, by a positioning fixture, the workpieces in the workstation so that one of said workpieces is in registration with the fixed locator;

obtaining, at the processor, measurement data reflecting the positions of the respective features of the workpieces and representing the measurement data in a common reference frame associated with the fixed locator;

receiving and storing, by the processor, the collection of assembly data and the measurement data;

defining, by the processor, ordered pairs of mating features;

using the processor to define and store in memory, for each ordered pair of mating features, a test vector that connects a pair of mating features, where each test vector has vector components represented as variables stored in memory;

using the processor to computationally discover a best fit for the mating workpieces by collectively applying to the test vectors a computational optimization process that seeks to minimize the lengths of the test vectors while taking into account predefined weighting factors that give certain features locational preference over others; using the processor to reorient the data representing the feature locations of the respective workpieces in the common reference frameusing the computationally discovered best fit;

using the processor to calculate the position in the common reference frame of a feature demarked for registration with the adjustable locator;

moving the adjustable locator in relation to the frame to the calculated position of the feature demarked for registration with the adjustable locator and thereby establishing a best fit orientation of the mating workpieces in physical space, where the adjustable locator is moved by at least one of a motor or a robot controlled by the processor;

positioning said mating workpieces in said best fit orientation by registration with said fixed and adjustable locators and then mechanically joining the mating workpieces.

2. The method of claim 1 wherein the step of obtaining measurement data is performed optically while the workpieces are disposed in the workstation.

3. The method of claim 1 wherein the step of obtaining measurement data is performed at least in part prior to placing at least one of the workpieces in the workstation.

4. The method of claim 1 wherein the step of obtaining measurement data is performed at least in part prior to placing at least one of the workpieces in the workstation and transformed into said common reference frame by said processor.

5. The method of claim 1 further comprising supplying said collection of assembly data as computer aided design data.

6. The method of claim 1 wherein the computational optimization process employs a numerical optimization algorithm.

7. The method of claim 1 wherein the computational optimization process employs a priority-based numerical optimization algorithm.

8. The method of claim 1 further comprising obtaining second measurement data reflecting the positions of features of workpieces other than those placed in the workstation and including said second measurement data in the step of using the processor to computationally discover a best fit for the mating workpieces.

9. A method for forming a multi-piece assembly by joining mating workpieces in a workstation, the workstation having a frame with at least one fixed locator and at least one adjustable locator, wherein each workpiece has at least one physical feature, the position of which within the multi-piece assembly is expressed in a collection of assembly data, the method having a processor coupled to the workstation and one or more hardware-based fixtures that are mechanically operated and/or electronically controlled by the processor, comprising:

placing, by a positioning fixture, the workpieces in the workstation so that one of said workpieces is in registration with the fixed locator;

obtaining, at the processor, measurement data reflecting the positions of the respective features of the workpieces and representing the measurement data in a common reference frame associated with the fixed locator;

receiving and storing, by the processor, the collection of assembly data and the measurement data;

defining, by the processor, ordered pairs of mating features;

using the processor to reorient the pairs of mating feature locations using a computationally discovered best fit;

using the processor to calculate the position in the common reference frame of a feature demarked for registration with the adjustable locator;

moving the adjustable locator in relation to the frame to the calculated position of the feature demarked for registration with the adjustable locator and thereby establishing a best fit orientation of the mating workpieces in physical space, where the adjustable locator is moved by at least one of a motor or a robot controlled by the processor;

positioning said mating workpieces in said best fit orientation by registration with said fixed and adjustable locators and then mechanically joining the mating workpieces.

10. The method of claim 9 wherein the step of obtaining measurement data is performed optically while the workpieces are disposed in the workstation.

11. The method of claim 9 wherein the step of obtaining measurement data is performed at least in part prior to placing at least one of the workpieces in the workstation.

12. The method of claim 9 wherein the step of obtaining measurement data is performed at least in part prior to placing at least one of the workpieces in the workstation and transformed into said common reference frame by said processor.

13. The method of claim 9 further comprising supplying said collection of assembly data as computer aided design data.

14. The method of claim 9 wherein the computational optimization process employs a numerical optimization algorithm.

15. The method of claim 9 wherein the computational optimization process employs a priority-based numerical optimization algorithm.

16. The method of claim 9 further comprising obtaining second measurement data reflecting the positions of features of workpieces other than those placed in the workstation and including said second measurement data in the step of using the processor to reorient the pairs of mating feature locations using a computationally discovered best fit.

\* \* \* \* \*